J. I. DANFORTH.
Meat-Presses.
No. 144,322.  Patented Nov. 4, 1873.
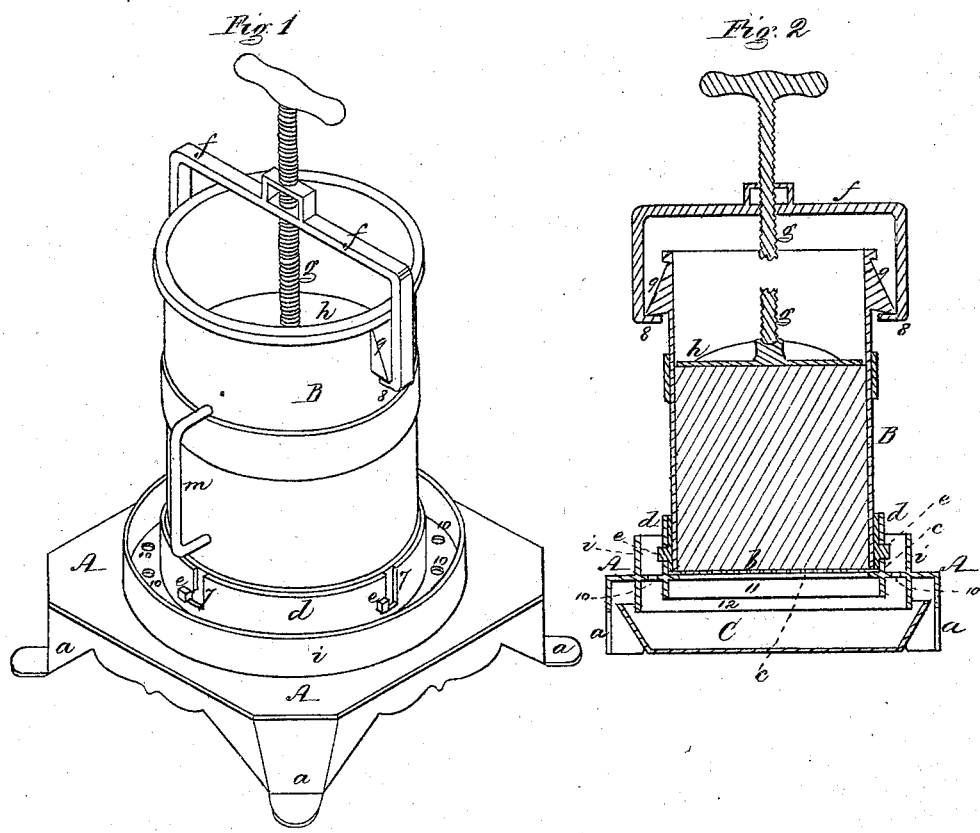
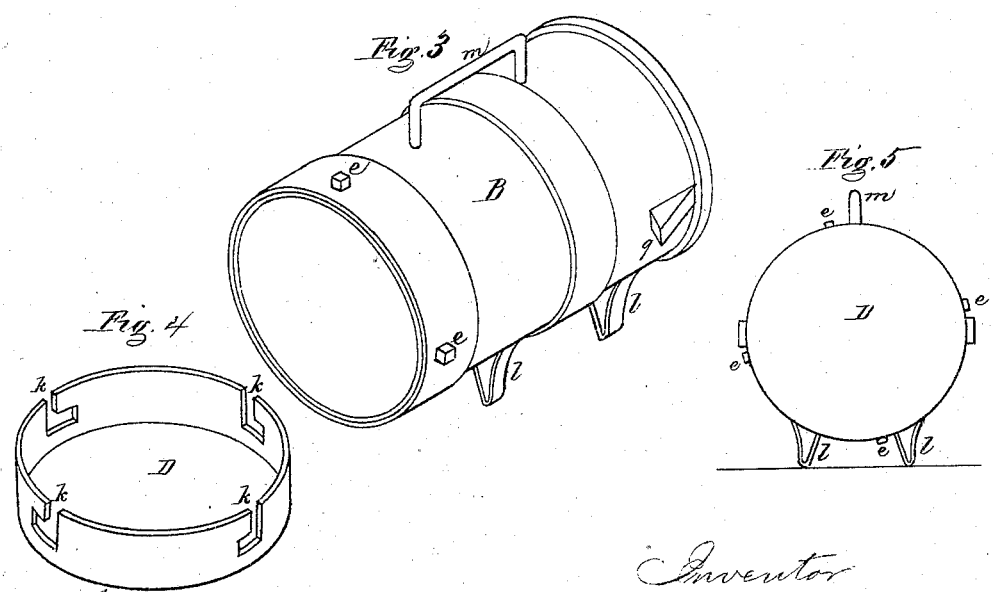
Witnesses
Inventor
Jacob I. Danforth

UNITED STATES PATENT OFFICE.

JACOB I. DANFORTH, OF NEWBURYPORT, MASSACHUSETTS.

IMPROVEMENT IN MEAT-PRESSES.

Specification forming part of Letters Patent No. 144,322, dated November 4, 1873; application filed August 23, 1873.

*To all whom it may concern:*

Be it known that I, JACOB I. DANFORTH, of Newburyport, in the county of Essex and State of Massachusetts, have invented an Improved Meat-Press, of which the following is a full, clear, and exact description, reference being had to the accompanying drawings making part of this specification, in which—

Figure 1 is a perspective view of my improved meat-press. Fig. 2 is a vertical section through the center of the same. Fig. 3 is a perspective view of the cylinder detached. Fig. 4 is a perspective view of the cap or cover which fits the bottom of the cylinder. Fig. 5 is an elevation of the bottom of the cylinder with the cap applied thereto.

Screw-presses are frequently used for pressing corned beef and other meats, which are afterward removed from the press, and placed in an ice-chest to cool. The meat, however, absorbs moisture from the ice, which soon causes it to spoil, while it is also liable to receive taints or flavors from other articles of food contiguous thereto. Furthermore, if taken out of the chest, it soon becomes hard and dry from exposure to the air, and much loss is experienced by hotels and restaurants from these causes.

My invention consists in the combination and arrangement of a perforated base with a flange-cap and removable hollow cylinder, as hereinafter set forth.

To enable others skilled in the art to understand and use my invention, I will proceed to describe the manner in which I have carried it out.

In the said drawings, A represents the base or stand of the press, which rests upon legs $a$. At the center of the base is an aperture, over which is placed a removable strainer, $b$, which rests on a ledge, $c$, from which rises a circular flange, $d$, within which is fitted the lower end of a vertical cylinder or receiver, B, for containing the cooked meat to be pressed. This cylinder B is made removable, and is held in place by pins $e$ projecting from it, which fit into angular slots 7 in the flange $d$. $f$ is a removable clamp, the hooked ends 8 of which fit over projections 9 on the cylinder; and through the center of this clamp passes a long screw, $g$, provided at its top with a cross-bar or handle, the lower end of the screw fitting into a socket formed at the top of a disk or follower, $h$, which fits the interior of the cylinder, and is intended to be placed on the top of the meat contained therein; and thus, as the screw is operated, the meat receives the desired amount of pressure, the liquid therefrom passing down through the strainer $b$ into a pan, C, placed beneath to receive it. The removable strainer $b$ can be replaced by one having holes of any desired size. Any fat which may be pressed out between the flange $d$ and the bottom of the cylinder B, or through the slots 7, is prevented from running over the base by a circular flange, $i$, and passes down through openings 10, between two flanges, 11 12, to the pan C below, and by this device the upper surface of the base is kept clean and free from grease. After the meat has been pressed, the cylinder B is turned back slightly, so as to move the pins $e$ out of the horizontal portions of the slots 7, when it is removed from the base A, after which a cover or cap, D, Fig. 4, having angular slots $k$, is applied to its lower end, and secured in place by the pins and slots, by which means the air is excluded from the bottom of the cylinder, while the upper surface of the meat is protected from the air by the layer of fat which always rises to the top. The cylinder, with the pressed meat therein, is then deposited in an ice-chest, or other cool place, in a horizontal position, so that it will rest upon legs or supports $l$ secured to its side; or it may rest upon its capped end. The clamp and screw can be allowed to remain in place, if there is sufficient space in the ice-chest; but if not, they can be readily removed.

When the pressed meat is required for use the cap D is removed from the cylinder; and if the clamp and screw are attached, the meat can be forced out thereby a short distance beyond the bottom of the cylinder, when a slice may be cut off, the thickness depending upon the distance which the meat projects beyond the end of the cylinder, against which the knife is pressed in cutting the slice. The meat is then again forced out, and a second slice is cut off, and so on until the required quantity has been obtained, when the cover D is replaced, and the cylinder, still containing the remainder of the meat, is put away until more is required.

If the clamp and screw are not attached to the cylinder, the meat may be forced out by hand; but I prefer to use the screw, as the thickness of the slice can be more readily gaged thereby; and these slices can be served in circular form, or may be cut into segments, presenting in either shape an attractive and inviting appearance, while there is no waste caused by trimming, as heretofore.

During the operation of cutting off the slices the cylinder is held by grasping a handle, $m$, on its side with one hand, the legs $l$ on the opposite side serving to steady it in position and support it at such a height as to admit of a plate being placed beneath its end to receive the slice cut off. The handle $m$ also facilitates the transportation of the cylinder from place to place.

By thus retaining the meat within the removable cylinder until it is entirely used up, it can be kept in a perfectly sweet and fresh state for a considerable length of time, as it will neither absorb moisture from the ice or taints or flavors from contiguous articles of food, or get dry and hard from exposure to the air, as has heretofore always been the case, the construction of all presses previously used for this purpose necessitating the removal of the meat to allow of its being put away and cut up.

The above-described press is particularly adapted for hotels and restaurants, and by its use much loss and waste may be avoided, while it is simple, inexpensive, and not liable to get out of order.

What I claim as my invention, and desire to secure by Letters Patent, is—

The base A, having an annular series of perforations, 10 10, in combination with the flange $i$, cap D, and cylinder B, as and for the purpose set forth.

Witness my hand this 20th day of August, A. D. 1873.

JACOB I. DANFORTH.

In presence of—
 P. E. TESCHEMACHER,
 W. J. CAMBRIDGE.